United States Patent
Stanglmaier et al.

(10) Patent No.: US 6,732,507 B1
(45) Date of Patent: May 11, 2004

(54) NO$_X$ AFTERTREATMENT SYSTEM AND METHOD FOR INTERNAL COMBUSTION ENGINES

(75) Inventors: Rudolf H. Stanglmaier, Fort Collins, CO (US); Ryan C. Roecker, San Antonio, TX (US); Charles E. Roberts, Jr., San Antonio, TX (US); Daniel W. Stewart, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 10/330,665

(22) Filed: Dec. 30, 2002

(51) Int. Cl.$^7$ .................................................. F01N 3/00
(52) U.S. Cl. ............................ 60/285; 60/280; 60/286; 60/297; 60/301; 60/303
(58) Field of Search .................... 60/274, 280, 285, 60/286, 295, 297, 301, 303, 311

(56) References Cited

U.S. PATENT DOCUMENTS

| | | | | |
|---|---|---|---|---|
| 5,746,989 A | * | 5/1998 | Murachi et al. | 60/274 |
| 5,974,791 A | * | 11/1999 | Hirota et al. | 60/303 |
| 5,974,793 A | * | 11/1999 | Kinugasa et al. | 60/285 |
| 6,109,024 A | * | 8/2000 | Kinugasa et al. | 60/286 |
| 6,119,452 A | | 9/2000 | Kinugasa et al. | |
| 6,167,696 B1 | * | 1/2001 | Maaseidvaag et al. | 60/274 |
| 6,176,079 B1 | | 1/2001 | Konrad et al. | |
| 6,182,443 B1 | * | 2/2001 | Jarvis et al. | 60/274 |
| 6,293,096 B1 | * | 9/2001 | Khair et al. | 60/286 |
| 6,338,244 B1 | | 1/2002 | Guenther et al. | |
| 6,615,580 B1 | * | 9/2003 | Khair et al. | 60/286 |
| 2002/0174648 A1 | * | 11/2002 | Minami | 60/295 |

* cited by examiner

Primary Examiner—Thomas Denion
Assistant Examiner—Tu M. Nguyen
(74) Attorney, Agent, or Firm—Gunn & Lee, P.C.

(57) ABSTRACT

A very high efficiency NO$_X$ aftertreatment system is provided for use in lean burn engines. A lean NO$_X$ adsorber is synergistically combined with a selective catalytic reduction catalyst to use the ammonia formed within the NO$_X$ adsorber, during regeneration of the NO$_X$ adsorber while periodically operating the engine in a fuel-rich combustion mode, to reduce NO$_X$ remaining in the exhaust gas stream after passage through the NO$_X$ adsorber during normal operation of the engine in a lean burn combustion mode.

3 Claims, 1 Drawing Sheet

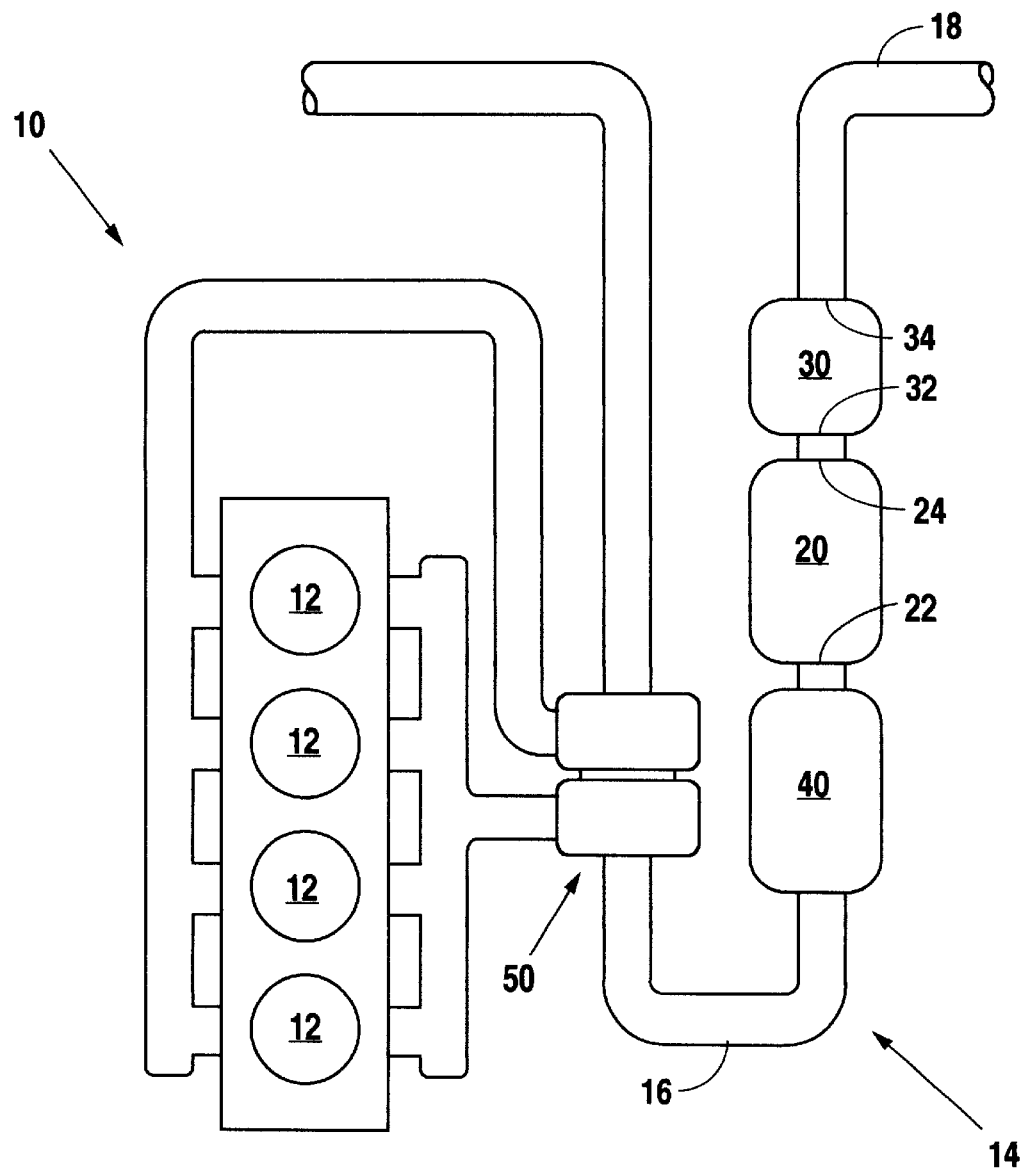

$NO_X$ AFTERTREATMENT SYSTEM AND METHOD FOR INTERNAL COMBUSTION ENGINES

BACKGROUND OF THE INVENTION

1. Technical Field

This invention relates generally to an exhaust gas aftertreatment system for internal combustion engines and more particularly to a $NO_X$ aftertreatment system for lean burn engines.

2. Background Art

Worldwide emissions regulations slated for introduction during the next five to ten years will require that gasoline and Diesel engines be equipped with some form of exhaust aftertreatment device. Perhaps of most concern to the Diesel engine industry are the proposed reductions in $NO_X$ (the various oxides of nitrogen) emissions, because they are the most difficult to eliminate from the exhaust stream of fuel-lean, better known as lean burn, combustion. Lean burn gasoline and Diesel engines offer the benefits of higher thermal efficiency, but suffer from difficulty with $NO_X$ emissions. Nitrogen is present in the air we breathe, and in the air that an engine consumes. Nitrogen replaces the air by approximately 75%. Nitrogen does not burn, but it can oxidize at temperatures over 2500° F. $NO_X$ ix a health hazard and one of the EPA's primary emission problems.

Without a major advance in catalyst technology, automobiles using lean burn engines will not be able to meet current and projected emission standards. Two of the main candidate technologies being considered for use in Diesel engines are selective catalytic reduction (SCR) using urea or other means to generate ammonia, and lean $NO_X$ adsorber catalysts. Neither one of these technologies has yet demonstrated the ability to meet the very stringent U.S. 2007 standards. Moreover, both technologies have considerable drawbacks. Selective catalytic reduction currently requires that a urea/water mixture be carried on-board and injected into the exhaust system, or some other form of on-board bulk ammonia generation. If excessive urea is injected, excessive ammonia ($NH_3$) is generated and there is a possibility of emitting toxic ammonia into the atmosphere. Lean $NO_X$ adsorber catalysts must be regenerated periodically by passing products of rich combustion through the adsorber. In order to obtain the highest $NO_X$ conversion efficiency possible, more rich products must be passed through the adsorber than are required to reduce the trapped $NO_X$. However, this has recently been discovered to produce $NH_3$ in the exhaust stream. As noted above, $NH_3$ is toxic and must be prevented from being discharged into the atmosphere. The only alternative heretofore has been to pass the gas containing $NH_3$ through an oxidation catalyst where it forms NO in the presence of an oxidizing atmosphere. However, this is not desirable since the aim of the aftertreatment itself is to eliminate NO and $NO_2$ in the first place.

An alternative for regenerating $NO_X$ adsorption catalysts is proposed in U.S. Pat. No. 6,176,079 B1 issued Jan. 23, 2001, to Konrad, et al. for a PROCESS AND APPARATUS FOR REDUCING NITROGEN-OXIDE EMISSIONS IN EXHAUST GAS, proposes using three serially connected catalyst units; a $NO_X$ adsorption catalyst followed by separate ammonia-producing and ammonia-adsorption catalysts. The process proposed by Konrad, et al. is directed at maximizing the production of ammonia. In similar fashion, U.S. Pat. No. 6,119,452 issued Sep. 19, 2000 to Kinugasa, et al., and more recently, U.S. Pat. No. 6,338,244 B1 issued Jan. 15, 2002, to Guenther, et al. are also directed to the intentional production of ammonia to optimize nitrogen-oxide emissions reduction. However, as noted above, ammonia is a toxic material and its release into the atmosphere must be prevented.

The present invention is directed to overcoming the problems associated with the intentional production of ammonia as proposed by Konrad, et al., Kinugasa, et al., and Guenther, et al. It is desirable to have a high efficiency $NO_X$ aftertreatment system that does not require the intentional production of large amounts of ammonia which could be released into the atmosphere if the ammonia-adsorption catalyst becomes saturated. It is also desirable to have a high efficiency $NO_X$ aftertreatment system for use with lean burn engines that advantageously uses ammonia undesirably generated when the engine control system is optimized to maximize the $NO_X$ conversion efficiency of the $NO_X$ adsorber system. This important feature of the present invention allows engine control systems to be tuned for the very high $NO_X$ conversion efficiency demanded by future engine emissions laws.

SUMMARY OF THE INVENTION

In one aspect of the present invention, a $NO_X$ aftertreatment system for a lean burn internal combustion engine adapted to selectively operate normally in a lean burn combustion mode and periodically in a defined fuel-rich combustion mode includes an exhaust system in fluid communication with at least one combustion chamber, a $NO_X$ adsorber and a selective reduction catalyst. The $NO_X$ adsorber is disposed in the exhaust system and is adapted to store at least a portion of $NO_X$ produced during operation of the engine in the lean burn combustion mode. The $NO_X$ stored in the $NO_X$ adsorber is reduced, and the $NO_X$ adsorber regenerated, during operation of the engine in the defined fuel-rich combustion mode. The defined fuel-rich combustion mode includes continued operation of the engine in a fuel-rich combustion mode for a period of time sufficient to provide more products of combustion than required to reduce the $NO_X$ stored in the $NO_X$ adsorber, whereby a portion of the excess products of combustion form ammonia. The selective reduction catalyst is also disposed in the exhaust system downstream of the $NO_X$ adsorber and is adapted to store ammonia formed during periodic operation of the engine in the defined rich combustion mode. During normal operation of the engine in the lean burn combustion mode, the stored ammonia provides a reducing agent for $NO_X$ remaining in the exhaust gases after passage through the $NO_X$ adsorber during normal operation of the engine in the lean burn combustion mode.

Other features of the $NO_X$ aftertreatment system embodying the present invention include a particulate matter filter disposed in the exhaust system of the $NO_X$ aftertreatment system.

In another aspect of the present invention, a method for reducing $NO_X$ emissions from a lean burn internal combustion engine includes normally operating the engine in a lean combustion mode and storing $NO_X$ generated during operation of the engine in the lean combustion mode in a $NO_X$ adsorber positioned in an exhaust system of the engine. The method further includes periodically operating the engine in a defined rich combustion mode in which the defined rich combustion mode includes continued operation of the engine in the fuel-rich operating mode for a period of time sufficient to provide more products of combustion than required to reduce the $NO_X$ stored in the $NO_X$ adsorber during operation of the engine in the lean combustion mode. During the periodic operation of the engine in the defined fuel-rich combustion mode, the portion of the excess products of combustion form ammonia. The ammonia formed during the defined fuel-rich operating mode is stored in a selective reduction catalyst disposed in the exhaust system downstream of the $NO_X$ adsorber and, during operation of the engine in the normal lean combustion mode, $NO_X$ remaining in the exhaust gases after passage of exhaust gases through the $NO_X$ adsorber are reduced by the selective reduction catalyst.

Other features of the method for reduced $NO_X$ emissions from a lean burn internal combustion engine include passing exhaust gases discharged from a combustion chamber of the engine through a particulate matter filter prior to discharge of exhaust gases into the atmosphere.

BRIEF DESCRIPTION OF THE DRAWING

A more complete understanding of the present invention, embodying a system and method for reducing $NO_X$ emissions from a lean burn combustion engine, may be had by reference to the following detailed description when taken in conjunction with the accompany drawing, wherein the drawing is a schematic representation of a lean burn engine adapted to carry out high efficiency $NO_X$ adsorption from exhaust gases discharged from the engine during normal operation in a lean burn combustion mode.

DETAILED DESCRIPTION OF THE INVENTION

The present invention is specifically directed to the reduction of $NO_X$ emissions carried in the exhaust stream of lean burn engines. Lean burn engines are designed to operate with a very lean air-fuel ratio during light and medium load conditions. When full power is needed, such as during acceleration or hill climbing, a lean burn gasoline engine typically reverts to a stoichiometric (14.7:1) ratio or richer. At idle, a Diesel engine may operate at air to fuel ratios in the 40 to 60:1 range. At full load, this ratio may drop to 18:1 (and the accompanying smoke in the process, indicating unburned fuel). Lean operation results in higher combustion efficiency and lower heat losses for better fuel economy. However, lean burn engines generally cannot meet the future strict $NO_X$ emissions standards using three-way or other oxidation catalyst technology. In order to meet the future $NO_X$ emissions standards, additional $NO_X$ controls, such as described below, will be required.

In the preferred embodiment of the present invention, a lean burn engine (Diesel, spark-ignited, or otherwise) is generally indicated in the drawing by the reference number 10, and includes a plurality of combustion chambers 12, and an exhaust system generally indicated by the reference number 14. Operation of the lean burn engine 10 is controlled by a conventional programmable electronic engine control unit, not shown, to normally operate the engine 10 in a lean combustion mode, and selectively for purposes of aftertreatment regeneration, temporarily in a fuel-rich combustion mode. Fuel-rich combustion products for $NO_X$ adsorber regeneration can be achieved by providing a fuel-rich mixture of air and fuel to the combustion chamber whereby fuel-rich combustion products are discharged from the combustion chamber or, alternatively or in combination with, burning a portion of the fuel outside of the combustion chamber but within the exhaust system upstream of the $NO_X$ adsorber. Thus, the term "fuel-rich combustion" as used in the following description and in the claims means "fuel combusted, or burned, in the presence of insufficient air to support complete combustion of the fuel whether carried out within a combustion chamber of the engine or downstream of the combustion chamber at a position upstream of $NO_X$ adsorber." Downstream augmentation is a popular method for providing fuel-rich combustion products for regeneration of certain catalysts in Diesel engine applications. The exhaust system 14 includes a conventional exhaust manifold 16, providing fluid communication of the exhaust system 14 with the combustion chambers 12, and a tailpipe 18 providing fluid communication of the exhaust system 14 with the ambient environment.

The exhaust system 14 also includes a lean $NO_X$ trap (LNT) 20, sometimes referred to as a $NO_X$ adsorber, having a first end 22 adapted to receive exhaust gases discharged from the combustion chambers 12, and a second end 24 spaced from the first end 22. Unlike catalysts which continually convert $NO_X$ to $N_2$, $NO_X$ adsorbers contain materials which store $NO_X$ under fuel lean conditions and release and catalytically reduce the stored $NO_X$ under fuel rich conditions. NO and $NO_2$ are acidic oxides and can be trapped on basic oxides typically provided in the $NO_X$ adsorber. More specifically, the LNT 20 chemically binds nitrogen oxides during lean engine operation. After the adsorber capacity is saturated, the system is regenerated, whereby the released $NO_X$ is catalytically reduced during a period of rich engine operation, i.e., during a period in which products of fuel-rich combustion are produced either within or outside of the combustion chamber. Furthermore, in accordance with the present invention, the LNT 20 is regenerated, i.e., operation of the engine 10 continued in the fuel-rich combustion mode for a length of time sufficient to provide more products of rich combustion than required to reduce the amount of $NO_X$ stored in the adsorber. During this process, some of the excess hydrogen and nitrogen are converted to ammonia ($NH_3$) within the adsorber.

The exhaust system 14 also includes a selective catalytic reduction (SCR) catalyst 30 having a first end 32 in direct communication with the second end 24 of the LNT 20, and a second end 34 spaced from the first end 32 of the LNT 20. In accordance with the present invention, as noted above, during regeneration of the LNT 20 more products of combustion are provided than required to reduce the $NO_X$ stored in the LNT 20. A portion of the excess products of combustion, containing hydrogen and nitrogen, are converted to ammonia ($NH_3$). The SCR catalyst 30 is placed following, i.e., downstream in the exhaust flow, the lean $NO_X$ adsorber 30 such that the $NH_3$ formed as a byproduct of regeneration of the LNT 20 is deposited and temporarily held in the SCR catalyst 30. When normal lean operation of the engine is resumed, the $NH_3$ stored in the SCR catalyst 30 is used for reduction of the portion of the $NO_X$ that is not adsorbed by the lean $NO_X$ adsorber during normal lean operation. Hence, the $NO_X$ conversion efficiency of the aftertreatment system is improved (by regeneration of the $NO_X$ adsorber and by catalytic reduction), and the emission of toxic ammonia prevented.

Desirably, the exhaust system 14 also includes a particulate matter (PM) trap or filter 40 disposed in the exhaust system 14. Diesel particulate traps capture particle emissions through a combination of surface-type and deep-bed filtration mechanisms, such as diffusional deposition, inertial deposition, or flow-line interception. Collected particulates are periodically removed from the filter 40 through thermal regeneration. Diesel filters are very effective in controlling the solid part of particulate matter emissions. Placement of the PM trap 40 upstream of the LNT 20 in the SCR catalyst 30, as illustrated in the drawing, provides protection of the downstream treatment devices against PM (soot) contamination, particularly during operation of the engine 10 in the defined fuel-rich combustion mode. However, if desired, the PM trap 40 may be placed downstream of the LNT 20 in the SCR catalyst 30, at which position it will effectively reduce the amount of particulate matter discharged into the ambient environment.

It is also desirable for the engine 10 to have a turbocharger, represented by the reference numeral 50 in the sole drawing, to assure sufficient air to the combustion chambers 12 for lean burn combustion. In addition to increasing engine efficiency, turbocharging is particularly useful in gasoline engine applications since gasoline engines are typically throttled and may not have sufficient air flow to support lean burn combustion across the engine's entire speed and load range.

Thus, the $NO_X$ aftertreatment system and method embodying the present invention provide a means for achieving high $NO_X$ conversion efficiency in the exhaust stream of a lean burn engine, whether it be Diesel, spark-ignited or otherwise, and prevents the emission of toxic ammonia to the atmosphere. The present invention requires no additional fluids to be carried onboard of a vehicle, since the ammonia is produced from combustion byproducts. The present invention provides a very significant advancement in the technology required to achieve the proposed U.S. 2007 emissions standards.

Although the present invention is described in terms of preferred illustrative embodiments, those skilled in the art will recognize that actual system arrangements will be dependent upon the configuration and operating characteristics of a specific engine. For example, the aftertreatment system may include exhaust gas recirculation and/or other emission control schemes or devices to reduce exhaust gas emissions. Such systems, and applications of the method embodying the present invention are intended to fall within the scope of the following claims. Other aspects, features, and advantages of the present invention may be obtained from a study of this disclosure and the drawing, along with the appended claims.

We claim:

1. A $NO_X$ aftertreatment system for a lean burn internal combustion engine having a plurality of combustion chambers and adapted to selectively operate normally in a lean burn combustion mode and only periodically in a defined rich combustion mode, said $NO_X$ aftertreatment system comprising:

an exhaust system in common fluid communication with all of said combustion chambers, said exhaust system includes a particulate matter filter interposed between said combustion chamber and the first end of a single $NO_X$ absorber;

said single $NO_X$ adsorber disposed in said exhaust system in direct fluid communication with all of said combustion chambers of the engine and having a first end adapted to receive exhaust gases discharged from said combustion chambers and a second end spaced from said first end, said single $NO_X$ adsorber being adapted to store at least a portion of $NO_X$ produced during normal operation of the engine in said lean burn combustion mode, and reduce said stored $NO_X$ and regenerate said $NO_X$ adsorber during periodic operation of the engine in said defined fuel rich combustion mode, said defined fuel rich combustion mode including continued operation of the engine in a fuel rich operating mode only for a period of time sufficient to provide more products of combustion than required to reduce the $NO_X$ stored in said single $NO_X$ adsorber whereby a portion of the excess products of combustion form ammonia; and a single selective catalytic reduction catalyst disposed in said exhaust system and having a first end in direct fluid communication with the second end of said single $NO_X$ adsorber, said single selective catalytic reduction catalyst being adapted to store said ammonia formed during periodic operation of the engine in said defined rich combustion mode, and during operation of the engine in said normal lean burn combustion mode said stored ammonia provides a reducing agent for $NO_X$ remaining in exhaust gases discharged from said combustion chamber, said single selective catalytic reduction catalyst has a second end spaced from said first end and said exhaust system includes a particulate matter filter in fluid communication with said second end of the single selective catalytic reduction catalyst.

2. The $NO_X$ aftertreatment system, as set forth in claim 1, wherein said single selective catalytic reduction catalyst is adapted to react substantially all of said ammonia stored in the selective reduction catalyst with $NO_X$ remaining in said exhaust gases after passage of the exhaust gases through the $NO_X$ adsorber whereby the emission of ammonia from the exhaust system of said engine is prevented.

3. The $NO_X$ aftertreatment system, as set forth in claim 1, wherein said engine has a turbocharger interposed in said exhaust system at a position between said combustion chamber and the first end of said single $NO_X$ adsorber.

* * * * *